(12) United States Patent
Fokle et al.

(10) Patent No.: US 10,939,265 B2
(45) Date of Patent: Mar. 2, 2021

(54) METHOD OF MANAGING AN APPLICATION

(71) Applicant: GEMALTO SA, Meudon (FR)

(72) Inventors: Milas Fokle, Gemenos (FR); Benoit Gonzalvo, Gemenos (FR); Guillaume Huysmans, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 85 days.

(21) Appl. No.: 15/768,211

(22) PCT Filed: Sep. 6, 2016

(86) PCT No.: PCT/EP2016/070961
§ 371 (c)(1),
(2) Date: Apr. 13, 2018

(87) PCT Pub. No.: WO2017/063790
PCT Pub. Date: Apr. 20, 2017

(65) Prior Publication Data
US 2018/0314810 A1    Nov. 1, 2018

(30) Foreign Application Priority Data

Oct. 16, 2015 (EP) .................................... 15306660

(51) Int. Cl.
*H04W 4/50* (2018.01)
*H04W 4/60* (2018.01)
(Continued)

(52) U.S. Cl.
CPC .............. *H04W 4/50* (2018.02); *G06F 21/12* (2013.01); *G06F 21/31* (2013.01); *G06F 21/44* (2013.01);
(Continued)

(58) Field of Classification Search
None
See application file for complete search history.

(56) References Cited

U.S. PATENT DOCUMENTS 7,146,645 B1 * 12/2006 Hellsten ............... G06F 8/61
726/33
2002/0108024 A1 * 8/2002 Diederiks ............ G11C 7/16
711/172
(Continued)

FOREIGN PATENT DOCUMENTS

EP    2 388 968 A1    11/2011

OTHER PUBLICATIONS

"Non-Volatile Memory and It's Use in Enterprise Applications" [online], Viking Technology; SNIA, Jan. 2014 [retrieved Aug. 21, 2019]. Retrieved from the internet: http://snia.org/sites/default/files/Non-Volatile%20Memory%20&%20Its%20Use%20in%20Enterprise%20Applications.pdf (Year: 2014).*
(Continued)

*Primary Examiner* — Taghi T Arani
*Assistant Examiner* — Joshua Raymond White
(74) *Attorney, Agent, or Firm* — Buchanan Ingersoll & Rooney PC

(57) ABSTRACT

The invention is a method for managing an application that includes a generic part and an additional part. The generic part is pre-installed on a device. The device gets a fingerprint of itself and after a user authentication sends to a server a request for getting the additional part. The request comprises credentials associated with the user or a reference of the user, the fingerprint and a reference of the application. The server generates a ciphered part of the additional part using a key based on both the credentials and the fingerprint and builds an auto-decrypt program configured to decipher the ciphered part. The device receives the ciphered part and the auto-decrypt program. It gets the fingerprint and the creden-
(Continued)

tials and retrieves the additional part by running the auto-decrypt program with said fingerprint and credentials as input parameters.

8 Claims, 3 Drawing Sheets

(51) Int. Cl.
- *H04W 12/02* (2009.01)
- *H04W 12/06* (2009.01)
- *H04W 12/00* (2009.01)
- *G06F 21/12* (2013.01)
- *G06F 21/31* (2013.01)
- *G06F 21/44* (2013.01)
- *G06F 21/60* (2013.01)
- *H04L 9/32* (2006.01)
- *H04L 29/06* (2006.01)
- *H04L 29/08* (2006.01)

(52) U.S. Cl.
CPC .......... *G06F 21/602* (2013.01); *H04L 9/3228* (2013.01); *H04L 63/0407* (2013.01); *H04L 67/16* (2013.01); *H04W 4/60* (2018.02); *H04W 12/001* (2019.01); *H04W 12/02* (2013.01); *H04W 12/06* (2013.01)

(56) References Cited

U.S. PATENT DOCUMENTS

| | | | |
|---|---|---|---|
| 2005/0246285 A1* | 11/2005 | Chakravarthy | G06F 21/125 705/59 |
| 2011/0296182 A1 | 12/2011 | Jia et al. | |
| 2014/0099925 A1 | 4/2014 | Schell et al. | |
| 2014/0143534 A1 | 5/2014 | Chastain et al. | |
| 2015/0277887 A1* | 10/2015 | Hoch | H04L 63/0442 713/171 |

OTHER PUBLICATIONS

International Search Report (PCT/ISA/210) dated Nov. 15, 2016, by the European Patent Office as the International Searching Authority for International Application No. PCT/EP2016/070961.

Written Opinion (PCT/ISA/237) dated Nov. 15, 2016, by the European Patent Office as the International Searching Authority for International Application No. PCT/EP2016/070961.

\* cited by examiner

METHOD OF MANAGING AN APPLICATION

FIELD OF THE INVENTION

The present invention relates to methods of managing applications. It relates particularly to methods of managing applications intended to be securely executed on devices.

BACKGROUND OF THE INVENTION

In the context of application for portable devices, more and more software applications are installed. Some of these applications allow to access sensitive data or services like mobile payment for example. There is a risk that a malevolent person duplicates a software application from a device to another one and uses the application for fraudulent transactions.

There is a need to increase protection of software applications in devices.

SUMMARY OF THE INVENTION

An object of the invention is to solve the above mentioned technical problem.

An object of the present invention is a method for managing an application which includes both a generic part and an additional part. The generic part is installed on a device. The method comprises the following steps:

the device gets a fingerprint of the device and initiates an authentication of a user of the device, and, in case of successful authentication sends to a server a request for getting the additional part, the request comprising either credentials associated with the user or a reference of the user, the fingerprint and a reference of the application.

the server identifies the additional part, generates a ciphered part of the additional part using a key based on both the credentials and the fingerprint and builds an auto-decrypt program configured to decipher the ciphered part.

the device receives the ciphered part and the auto-decrypt program.

the device gets the fingerprint and the credentials and retrieves the additional part by running the auto-decrypt program with said fingerprint and credentials as input parameters.

Advantageously, the device may store the ciphered part and the auto-decrypt program into its non-volatile memory, the device may get the fingerprint and initiate an authentication of the user, and, in case of successful authentication, the device may get the credentials and run the auto-decrypt program as soon as the additional part is going to be executed.

Advantageously, the device may get the fingerprint of the device and a user reference, and may send to a controller server a usage request comprising the credentials or a reference of the user, the fingerprint and the reference of the application. The controller server may check if the user is granted to run the application, and send a result reflecting the checking to the device. The device may authorize or not execution of the application depending of the received result.

Advantageously, the device may have a variable runtime environment. The request may comprise a feature reflecting the state of the current runtime environment and the request may be sent as soon as the additional part is going to be executed.

Advantageously, the server may dynamically select an encryption algorithm among a plurality of encryption algorithms for generating the ciphered part.

Another object of the present invention is a device able to communicate with a server. The device is configured to receive and install a generic part of an application. The device comprises an agent configured to get a fingerprint of the device and to initiate an authentication of a user of the device, and, in case of successful authentication, to retrieve credentials associated with the user. The agent is configured to send to the server a request for getting an additional part of the application. The request comprises the credentials or a reference of the user, the fingerprint and a reference of the application. The agent is configured to receive from the server an auto-decrypt program associated to the application and to retrieve the additional part by running the auto-decrypt program with the fingerprint and credentials as input parameters.

Advantageously, the device may be configured to store the ciphered part and the auto-decrypt program into its non-volatile memory. The agent may be configured to initiate an authentication of the user and, in case of successful authentication, to get the fingerprint and the credentials and to run the auto-decrypt program as soon as the additional part is going to be executed.

Advantageously, the agent may be configured to send to a controller server a usage request comprising the credentials or a reference of the user, the fingerprint and the reference of the application. The agent may be configured to authorize or not execution of the application depending on a result received from the controller server in response to the usage request.

Advantageously, the device has a variable runtime environment and the agent may be configured to add in the request a feature reflecting the current state of the variable runtime environment. The agent may be configured to send the request as soon as the additional part is going to be executed.

Another object of the present invention server able to participate to the deployment of an application including two parts: a generic part and an additional part. The generic part is previously installed in a device. The server comprises a checking agent adapted to receive a request for getting the additional part. The request comprises credentials associated with a user of the device or a reference of a user of the device, a fingerprint of the device and a reference of the application. The server comprises a discovery agent adapted to identify the additional part. The server comprises a generator agent adapted to generate a ciphered part of the additional part using a key based on both the credentials and the fingerprint. The server comprises an enciphering agent adapted to build an auto-decrypt program configured to decipher the ciphered part and to send both the ciphered part and the auto-decrypt program in response to the request.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of devices able to communicate with a distant server and intended to run a software application. In particular, the invention is well-suited for software applications running on portable devices like mobile phone, tablet PC, electronic pair of glasses, electronic watch, and electronic bracelet. It also may apply to any device like a vehicle, a meter, a slot machine, a TV or a computer.

Figure 1:
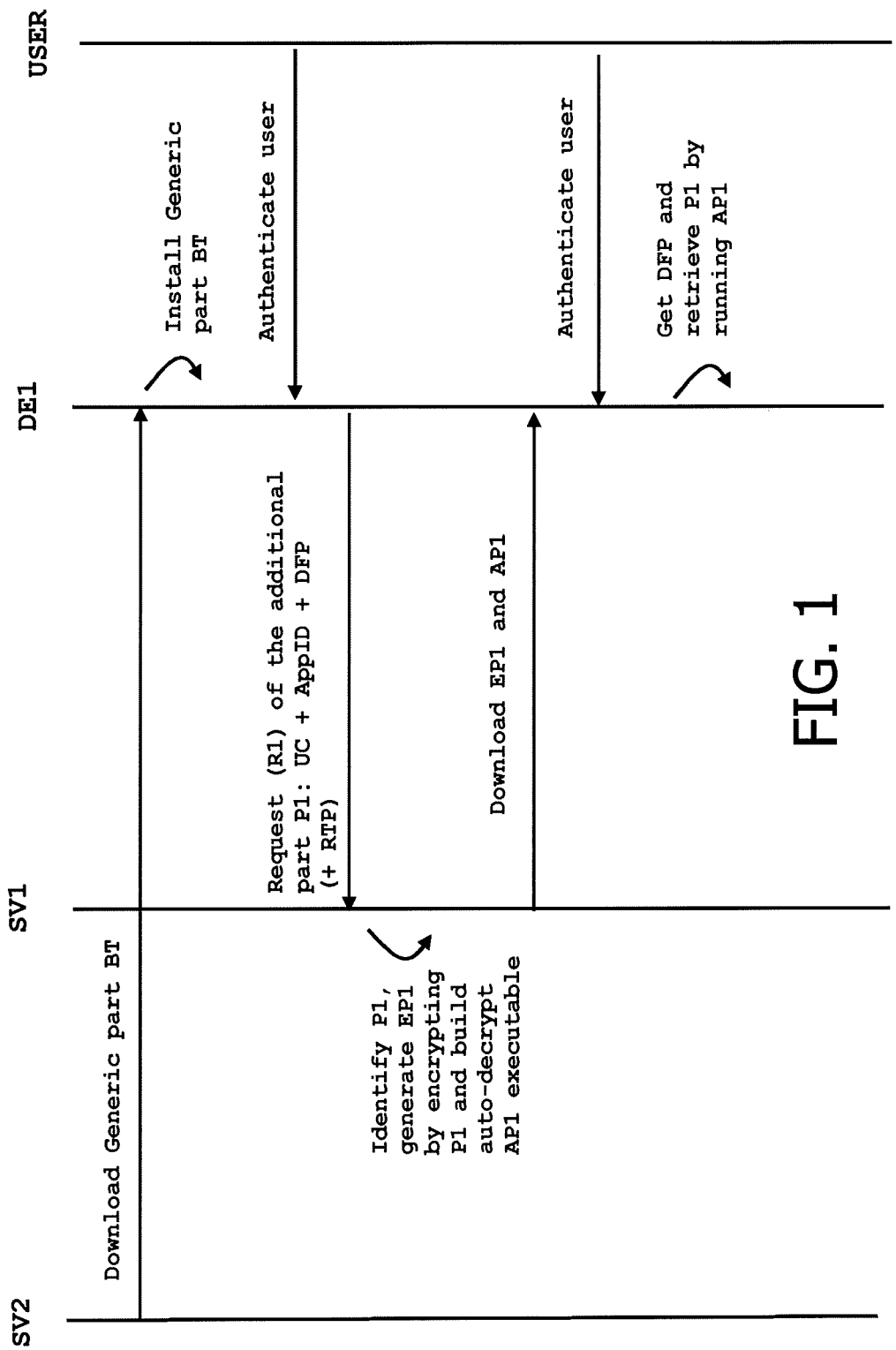
FIG. 1 is flowchart showing an example of installation of an application in a device according to the invention.

FIG. 1 shows an example of a method for managing a software application according to the invention.

In this example, the device DE1 is a mobile phone having its own operating system like Android® for instance.

The software application A1 is designed so that it comprises two complementary parts: a generic part BT and an additional part P1.

Preferably, the generic part BT may be a software part which can be used for several kinds of application. It may comprise features and components that are common to several applications.

The generic part BT is separate from the operating system of the device DE1.

Advantageously, the generic part BT may be developed as a bootstrap which is able to manage the downloading of the additional part P1.

At a first step, a server SV2 sends the generic part BT to the device DE1 and the generic part BT is installed in the device DE1. In one embodiment, the generic part BT may be freely retrieved and installed from the server SV2.

At a second step, the device DE1 authenticates the user. For example, the device DE1 may ask the user to enter a PIN code or a specific password through the screen/keyboard of the device DE1. The device DE1 may also get a biometric measure of the user.

Alternatively, the user may be authenticated using a secret data retrieved from another device which stores these secret data. This other device may be a USB token or a NFC (Near field Communication) token for instance. In case of successful user authentication, the device DE1 gets user's credentials UC.

At a third step, the device DE1 retrieves a fingerprint DFP of the device DE1 and builds a request R1 which comprises the user's credentials UC, the fingerprint DFP and a reference AppID to the application A1.

In another example, the credentials UC may be derived from a master credential so that the used credentials UC is diversified for every transaction. In this case, the device DE1 retrieves the master credential from its own memory and generates a derived token which is used as credentials UC.

In another example, the device DE1 may build a request R1 that comprises a reference (i.e. an identifier) of the user instead of the user's credentials UC. In this case, the credentials UC is assumed to be pre-stored in both sides: server and device DE1.

In another example, the credentials UC may be derived from the secret data used (e.g. provided) by the user to authenticate to the device DE1.

The reference AppID may be an identifier or the name of the application A1 for instance. The fingerprint DFP may be a serial number of the device DE1 or any data specific to the device DE1.

Advantageously, fingerprint DFP may be generated based on several measures or elements of the device DE1. For instance, the fingerprint DFP may built from a combination of the number (and/or name) of applications installed on the device DE1 and the size of remaining free non-volatile memory (NVM) of the device DE1.

Then the device DE1 sends the request R1 to a server SV1 for getting the additional part P1.

At a fourth step, the server SV1 identifies the additional part P1 based on the reference AppID. The server SV1 may either generate or retrieve from a dedicated storage the additional part P1. Then the server SV1 generates a ciphered part EP1 of the additional part P1 using both the user's credentials UC and the fingerprint DFP as input parameters. The server SV1 also builds an auto-decrypt program AP1 designed to decipher the ciphered part EP1.

Alternatively, the server SV1 may compute a key based on both the user's credentials UC and the fingerprint DFP and may generate the ciphered part EP1 using this computed key.

In one embodiment, the server SV1 may use a preset encryption algorithm for generating the ciphered part EP1. Optionally, the server SV1 may dynamically select an encryption algorithm among several encryption algorithms for generating the ciphered part EP1 so that the used encryption algorithm can differ from one time to another. For example, the server SV1 may randomly select either AES (Advanced Encryption Standard) or XOR algorithm.

The auto-decrypt program AP1 is an autonomous software application which is configured to decipher the ciphered part EP1. It needs both the user's credentials UC and the fingerprint DFP as input parameters.

At a fifth step, the server SV1 sends both the ciphered part EP1 and the auto-decrypt program AP1 in response to the request R1. Preferably, the device DE1 may get these two elements in a unique bundle. Optionally, these two elements may be received in two packages.

From this point, two options are possible. Either the bundle (comprising both the ciphered part EP1 and the auto-decrypt program AP1) is stored in the non-volatile memory of the device DE1 and will be used later, or it is immediately used to execute the application A1 without being stored permanently in the device DE1.

In the first option, each time the additional part P1 is going to start (i.e. as soon as the additional part P1 is about to be executed), the device DE1 authenticates the user and in case of successful authentication gets again the user's credentials UC and the fingerprint DFP of the device DE1. Then the device DE1 launches the execution of the auto-decrypt program AP1 using the user's credentials UC and the fingerprint DFP as input parameters to retrieve the additional part P1. The device DE1 stores the additional part P1 in its working memory which is erased when the device DE1 reboots or switch off.

Thanks to this option, even if the bundle (comprising both the ciphered part EP1 and the auto-decrypt program AP1) is illegally copied from the device DE1 to another device, the additional part P1 cannot be retrieved into this other device because the fingerprint will differ and the user's credentials will not be available.

In the second option, the device DE1 immediately (i.e. as soon as the auto-decrypt program AP1 has been received) retrieves the additional part P1 by executing the auto-decrypt program AP1 using the user's credentials UC and the fingerprint DFP as input parameters without a second user authentication. In the second option, the devices does not permanently store the auto-decrypt program AP1, the ciphered part EP1 and the additional part P1 in its non-volatile memory.

Optionally, the device DE1 may retrieve a feature (i.e. characteristic) RTP specific to the current state of its runtime environment and insert this feature RTP in the request R1. The server SV1 can be designed to generate an additional part P1 which can be used only with the current runtime environment of the device DE1. In other words, the additional part P1 is customized for being usable by the current runtime environment of the device DE1 only. For instance, the feature RTP may be the first address of the memory area which has been allocated for running the additional part P1. The runtime environment of the device DE1 is considered as being variable enough so that the custom additional part P1 cannot be used later (i.e. when the state of the runtime environment has changed) in the device DE1 or in another device.

In this case, the additional part P1 is customized according to the state of the target runtime environment.

To strengthen the security level, the server SV1 and the device DE1 may establish a secure channel before exchanging the request R1 and its response. For example, they may communicate through an OTA (Over-The-Air) 3G or 4G channel or through a HTTPS session.

Although in the above described examples, the servers SV1 and SV2 are shown as two separate entities, they may be merged in a single server or machine.

Figure 2:
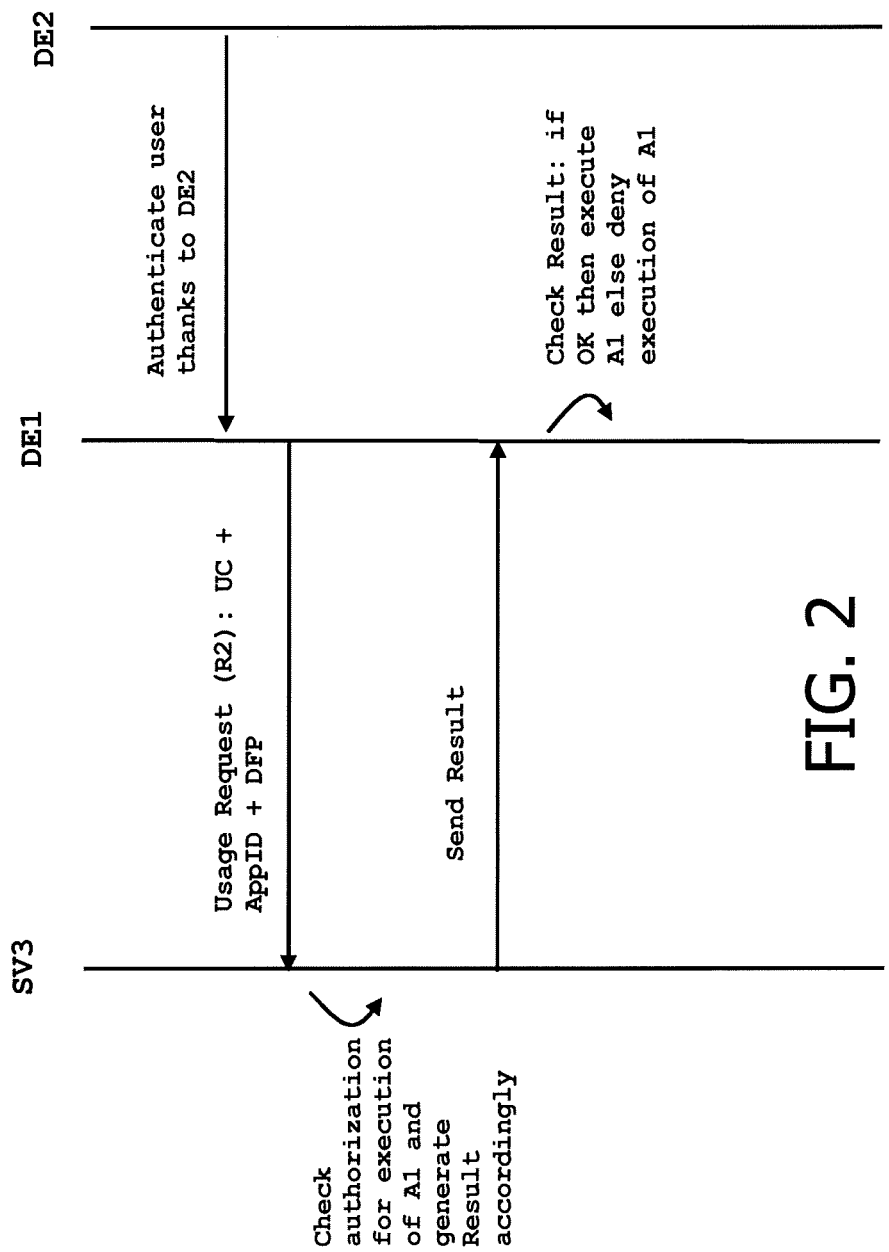
FIG. 2 is flowchart showing an example of control of execution of an application in a device according to the invention.

FIG. 2 shows an example of method for controlling execution of a software application according to the invention.

In this example, the device DE1 may be a tablet PC and the application A1 may be similar to the application described at FIG. 1.

This method applies to the first option described above. (i.e. when the ciphered part EP1 and the auto-decrypt program AP1 are permanently stored in the non-volatile memory of the device DE1.)

As soon as the additional part P1 is about to be executed, the device DE1 authenticates the user and in case of successful authentication gets the user's credentials UC. For example, it can retrieve the credentials UC from a second device DE2 which stores these credentials. For instance, the device DE2 may be a device able to communicate with the device DE1 through a contactless session, like NFC, Wi-fi or Bluetooth®.

The device DE1 retrieves a fingerprint DFP of the device DE1 and builds a usage request R2 which comprises the user's credentials UC (or a reference of the user), the fingerprint DFP and a reference AppID to the application A1. Then the device DE1 sends the usage request R2 to a server SV3 for getting authorization to run the additional part P1.

The server SV3 identifies the additional part P1 (and thus the application A1) based on the reference AppID. Then the server SV3 checks if the user whose credentials UC (or a reference) have been received is authorized to execute the additional part P1 (i.e. to execute the application A1) on the device corresponding to the fingerprint DFP. This checking may be based on an account allocated to the user. It may be based on a limited number of execution(s) and/or a time window.

Then the servers SV3 sends to the device DE1 a response reflecting the result of the checking. In case of successful checking, the device DE1 authorizes execution of the additional part P1, else it denies execution of the additional part P1.

In one example, the auto-decrypt program AP1 may be configured to deny deciphering of the additional application P1 if the result provided by the server SV3 is negative.

In another example, the generic part BT may be configured to deny execution of the additional part P1 in case of wrong result sent by the server SV3.

In a third example, the server SV3 may send a data whose value is used as input parameter by the auto-decrypt program AP1.

Optionally, the server SV3 and the server SV1 of FIG. 1 may be merged in a single server or machine.

Figure 3:
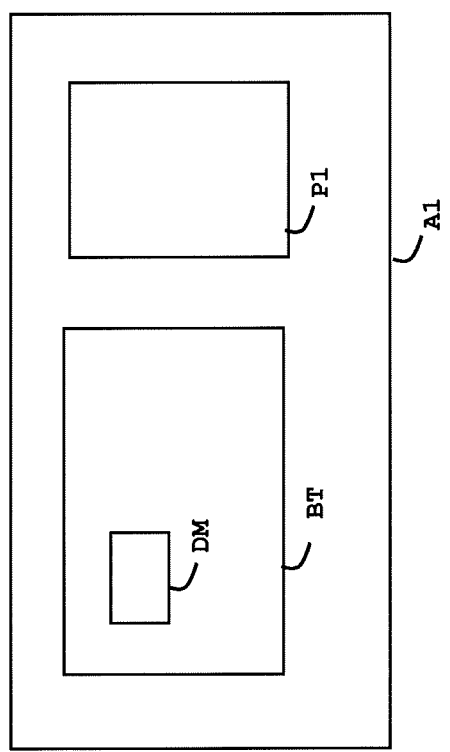
FIG. 3 shows an example of design of application managed according to the invention.

FIG. 3 shows an example of architecture of the application A1 managed according to the invention.

The software application A1 comprises two parts which are required for the correct execution of the application: a generic part BT and an additional part P1.

The generic part BT is specifically designed for the application A1. The generic part BT is specific to the application A1.

The generic part BT may be seen as an incomplete application which needs the additional part P1 to fully become the complete application A1.

It is to be noted that the generic part BT is neither an element of the operating system nor a universal virtual machine like Java RE. It is not a sharable library (like a DLL). It is a standalone software that can be started independently and which requires an additional part to execute desired treatments.

Conversely, the additional part P1 is not a standalone software that can be started independently.

In one example, the generic part BT comprises features and applicative data whose security level is low and the additional part P1 comprises features and applicative data whose security level is high.

In a one example, the generic part BT comprises a download manager DM. The download manager DM is adapted to manage the downloading of the additional part P1 from a remote server.

Thanks to the invention, the generic part BT may be registered as a unique application in an application store. A fleet of devices can get the generic part BT from the application store and then securely load the additional part P1 which has be customized for each device.

The invention applies to any type of software application. For example, the application A1 may be dedicated to physical access control, identity, payment, Telecom, loyalty, or services access like videos, photos, or music.

Figure 4:
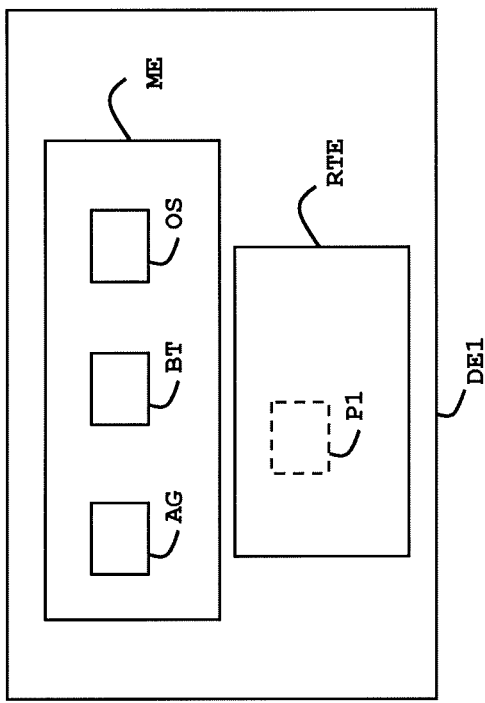
FIG. 4 shows an example of architecture of a device configured to manage applications according to the invention.

FIG. 4 shows an example of architecture of the device DE1 configured to manage applications according to the invention.

The device DE1 is similar to the mobile phone of FIG. 1. The device DE1 includes a non-volatile memory ME which may be a flash memory. The operating system OS of the device DE1, an agent AG and the generic part BT of the application A1 are stored in the non-volatile memory ME. The device DE1 also includes a runtime environment RTE which may comprise the additional part P1 (drawn in dotted line) when it has been deciphered and is ready to use. The runtime environment RTE comprises a working memory (e.g. volatile RAM).

The agent AG is configured to retrieve a fingerprint DFP of the device DE1. For instance, the agent may be adapted to read an identifier (i.e. the serial number) of the device DE1 or an identifier of a hardware component uniquely embedded in the device DE1 (like a hard disk or a display for example). The agent AG is also configured to retrieve the credentials UC associated to a user of the device DE1. The agent AG may also be configured to retrieve a reference of the user like an identifier, a name, or a subscription number. The agent AG is configured to build a request R1 comprising the credentials UC (or a user reference), the fingerprint DFP and a reference AppID of the application A1. The reference AppID may be an identifier of the application A1 for example.

The agent AG may also be configured to get a master credentials and to derive the credentials UC from the master credentials. (as a temporary token or a one-time token for instance)

The request R1 is a request aiming at getting the additional part P1 of the application A1 from the server SV1. The agent AG is also configured to receive from the server SV1 an auto-decrypt program AP1 associated to the application A1 and to retrieve the additional part P1 by running the auto-decrypt program AP1 with the fingerprint DFP and credentials UC as input parameters.

Advantageously, the agent AG may be configured to get the fingerprint DFP and the credentials UC, and to run the auto-decrypt program AP1 as soon as the additional part P1 is going to be executed.

Advantageously, the agent AG may be configured to check the integrity of the received auto-decrypt program AP1 (and/or the received ciphered part EP1) and to gets the fingerprint DFP and user's credentials UC only in case of successful integrity checking.

Advantageously, the agent AG may be configured to send to a controller server SV3 a usage request R2 comprising the credentials UC (or a user reference), the fingerprint DFP and the reference AppID of the application A1. In this case, the agent AG may be also configured to authorize or not execution of the additional part P1 depending on the result received from the controller server SV3 in response to the usage request R2.

Optionally, the agent AG may be configured to add in the request R1 a feature RTP that reflects the current state of the runtime environment RTE (i.e. which is specific to the current state of RTE). The agent AG may also be configured to send the request R1 as soon as the additional part P1 is going to be executed.

In one embodiment, the agent AG and the generic part BT may be merged in a single entity. For instance, the generic part BT may be configured to provide all features of the agent AG.

Figure 5:
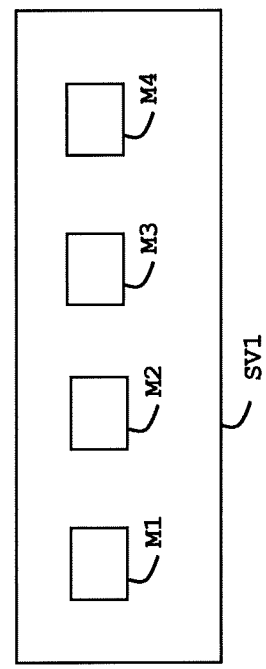
FIG. 5 shows an example of architecture of a server configured to manage applications according to the invention.

FIG. 5 shows an example of architecture of the server SV1 configured to manage applications according to the invention.

The server SV1 comprises a checking agent M1, a discovery agent M2, a generator agent M3 and an enciphering agent M4. The checking agent M1 is configured to receive the request R1 as described at FIG. 1. The discovery agent M2 is configured to identify the additional part P1 based on the reference AppID found in the request R1. The generator agent M3 is configured to generate a ciphered part EP1 of the additional part P1 using both the user's credentials UC (or the user reference) and the device fingerprint DFP found in the request R1.

The enciphering agent M4 is designed to build an auto-decrypt program AP1 configured to decipher the ciphered part EP1 and to send both the ciphered part EP1 and the auto-decrypt program AP1 in response to the request R1.

The generator agent M3 and the enciphering agent M4 may use a preset encryption algorithm or select an encryption algorithm among several available encryption algorithms.

These four agents may be implemented as distinct software components or combined in one or several components.

According to the invention, once the additional part P1 is installed in the device DE1, it can be used as long as the device is not turned off or rebooted, even if the connection with the server SV1 is lost. In other word, the device DE1 could become offline when running the application A1.

Thanks to the invention, the execution of the additional part P1 (and thus of the application A1) is protected against fraudulent attempts since user authentication is always performed and both user's credentials and device fingerprint are required before starting the execution. The invention provides an anti-cloning solution.

The invention allows to provide a diversified bundle (i.e. ciphered part EP1 and auto-decrypt program AP1) to each genuine user while providing the same application (i.e. service) to every authorized user. It must be understood, within the scope of the invention that the above-described embodiments are provided as non-limitative examples. In particular, the device may run several applications protected with the invention and the software applications may be written in any languages.

The architecture of the device DE1 and the architecture of the server SV1 are provided as example only.

The invention claimed is:

1. A method for managing an application,
wherein a generic part of the application is installed on a device having a variable runtime environment and wherein said method comprises the steps:
the device getting a fingerprint of the device and initiating an authentication of a user of the device, and, in case of successful authentication, sending to a server a request for getting an additional executable part of the application, said request comprising credentials associated with the user or a reference of the user, the fingerprint, a feature specific to the current state of said runtime environment and a reference of the application,
upon receipt of the request, the server generating the additional executable part customized for being executable by the current runtime environment of the device only, said application including two parts: the generic part and the additional executable part, wherein the device comprises a memory component including a memory area which is allocated for running the additional executable part and wherein the server uses a first address of said memory area to customize the additional executable part according to the current state of the runtime environment,
the server generating a ciphered part of the additional executable part using a key based on both the credentials and the fingerprint and building an auto-decrypt program configured to decipher the ciphered part,
the device receiving the ciphered part and the auto-decrypt program from the server,
the device getting the fingerprint and the credentials, and retrieving the additional executable part by running the auto-decrypt program with said fingerprint and credentials as input parameters.

2. The method according to claim 1, wherein the device stores the ciphered part and the auto-decrypt program into its non-volatile memory, wherein the device gets the fingerprint and initiates an authentication of the user, and wherein, in case of successful authentication, the device gets the credentials and runs the auto-decrypt program upon a determination to retrieve and execute the additional executable part.

3. The method according to claim 1, wherein the device gets the fingerprint of the device and a user reference, and sends to a controller server a usage request comprising the credentials or a reference of the user, the fingerprint and the reference of the application,
the controller server checks if the user is granted to run the application, and sends a result reflecting the checking to the device,
the device authorizes execution of the application only when the received result indicates that the user is granted to run the application.

4. The method according to claim 1, wherein the server dynamically selects an encryption algorithm among a plurality of encryption algorithms for generating the ciphered part.

5. A hardware device able to communicate with a server, wherein the device is configured to receive and install a generic part of an application, wherein the device has a variable runtime environment and comprises:
an agent configured to get a fingerprint of the device and to initiate an authentication of a user of the device, and, in case of successful authentication, to retrieve credentials associated with the user, and to send to said server a request for getting an additional executable part of the application customized for being executable by the current runtime environment of the device only, said application including two parts: the generic part and the additional executable part, said request comprising the credentials or a reference of the user, the fingerprint, a feature specific to the current state of said runtime environment, and a reference of the application,
wherein the hardware device comprises a memory component including a memory area which is allocated for running the additional executable part,
wherein the additional executable part is customized according to the current state of the runtime environment by said server which used a first address of said memory area,
wherein said agent is configured to receive from the server a ciphered part and an auto-decrypt program associated to the application, said auto-decrypt program being configured to decipher the ciphered part and wherein said agent is configured to retrieve the additional executable part by running the auto-decrypt program with the fingerprint and credentials as input parameters.

6. The device according to claim 5, wherein the device is configured to store the ciphered part and the auto-decrypt program into its non-volatile memory and wherein the agent is configured to initiate an authentication of the user and, in case of successful authentication, to get the fingerprint and the credentials and to run the auto-decrypt program upon a determination to retrieve and execute the additional executable part.

7. The device according to claim 5, wherein the agent is configured to send to a controller server a usage request comprising the credentials or a reference of the user, the fingerprint and the reference of the application and wherein the agent is configured to authorize execution of the application only when a result, received from the controller server in response to the usage request, indicates that the user is granted to run the application.

8. A hardware server able to participate to the deployment of an application, said server being an electronic appliance, a generic part of the application being previously installed in a device having a variable runtime environment, wherein the server comprises a checking agent adapted to receive a request for getting an additional executable part of the application, said request comprising credentials associated with a user of the device or a reference of a user of the device, a fingerprint of the device, a feature specific to the current state of said runtime environment and a reference of the application,
wherein, upon receipt of the request, the server generates the additional executable part customized for being executable by the current runtime environment of the device only, wherein the device comprises a memory component including a memory area which is allocated for running the additional executable part, wherein the hardware server uses a first address of said memory area to customize the additional executable part according to the current state of the runtime environment, wherein the server comprises a generator agent adapted to generate a ciphered part of the additional executable part using a key based on both the credentials and the fingerprint, wherein the server comprises an enciphering agent adapted to build an auto-decrypt program configured to decipher the ciphered part and to send to the device both the ciphered part and the auto-decrypt program in response to the request.

* * * * *